United States Patent
Sugano

(10) Patent No.: US 7,187,166 B2
(45) Date of Patent: Mar. 6, 2007

(54) ELECTRICAL PROPERTY EVALUATION APPARATUS

(75) Inventor: Yoshiharu Sugano, Chiba (JP)

(73) Assignee: SII NanoTechnology Inc. (JP)

(*) Notice: Subject to any disclaimer, the term of this patent is extended or adjusted under 35 U.S.C. 154(b) by 189 days.

(21) Appl. No.: 10/809,555

(22) Filed: Mar. 25, 2004

(65) Prior Publication Data

US 2004/0201378 A1    Oct. 14, 2004

(30) Foreign Application Priority Data

Mar. 28, 2003   (JP) ............................. 2003-091986

(51) Int. Cl.
*G01N 27/82*    (2006.01)
*G01R 33/12*    (2006.01)

(52) U.S. Cl. ......................... 324/234; 324/210

(58) Field of Classification Search .............. 324/234, 324/210

See application file for complete search history.

(56) References Cited

U.S. PATENT DOCUMENTS 6,294,911 B1 *  9/2001  Shimazawa et al. ........ 324/210
6,657,431 B2 * 12/2003  Xiao .......................... 324/244

* cited by examiner

*Primary Examiner*—Reena Aurora
(74) *Attorney, Agent, or Firm*—Adams & Wilks

(57) ABSTRACT

An electrical property evaluation apparatus for measuring an electrical property of an object includes a magnetic field generating mechanism that generates a magnetic field in a target area on the object, and a magnetic sensor for measuring the magnetic field near the target area. A cantilever having a conducting probe is supported so that the probe can be brought into contact with the target area. A bending measurement mechanism measures an amount of bending of the cantilever when the probe is brought into contact with the object. A control section controls a moving mechanism to maintain the bending amount of the cantilever constant. A voltage source applies a voltage to the probe, and an electrical property measuring section measures a current or an electrical resistance between the probe and the object in contact with each other.

6 Claims, 3 Drawing Sheets

ELECTRICAL PROPERTY EVALUATION APPARATUS

BACKGROUND OF THE INVENTION

1. Field of the Invention

The present invention relates to an electrical property evaluation apparatus for measuring samples, such as samples having a magnetoresistive effect device on a microscale area thereof, and evaluating electrical properties thereof.

2. Description of the Related Art

As everyone knows, there has been generally known a method for gauging a current flowing through a sample and evaluating electrical properties in order to evaluate a sample, such as an electronic material, in electrical properties including the electrical resistance, electrical conductivity, and current-voltage characteristics. For example, as an apparatus for measuring electrical properties of a bulk electronic material, there has been known an electrical property evaluation apparatus, such as an electrical conductivity measuring apparatus having an electrode probe and a spreading resistance measuring apparatus.

Further, as an apparatus for measuring electrical properties including an electrical resistance of a sample of an electronic material, etc. on a micro-scale area of a molecule-size level, there has been known a scanning tunneling microscope. In the scanning tunneling microscope, a conductive metal probe having a tip diameter with a curvature radius of a few tens of nanometers is brought a few nanometers close to a sample to flow a tunnel current between the probe and the sample. Then, the microscope causes the metal probe to scan the sample surface while controlling the distance between the metal probe and sample so as to keep the tunnel current constant, whereby the geometry of the sample surface can be imaged.

Also, there has been known a scanning multi-probe microscope capable of scanning in a magnetic field, which performs the analysis of surface geometry of a material with a vacuum container placed in a strong magnetic field according to a superconducting magnet (see JP-A-2001-50885, Paragraph No. 0002-0011 and FIG. 1, for example). The scanning multi-probe microscope capable of scanning in a magnetic field allows the observation of surface geometry of magnetic materials and semiconductor materials in the condition where a strong magnetic field is applied, e.g. the observation of the change in magnetic domain and the magnetic field-induced phase change process in a magnetic material under a strong magnetic field.

In recent years, various kinds of memory devices, electronic devices, etc. have been developed, and therefore the evaluation of physical properties, functions, characteristics of materials used therefor and electrical properties including the performance of each device has been regarded as important. Especially, it is required to evaluate the characteristics of memories for storing data utilizing magnetism, e.g. MRAM (Magnetoresistive Random Access Memory) with a tunnel magnetoresistive effect device, which is expected to be a next-generation memory device, and RRAM (Resistance RAM) with a large magnetoresistive effect device. This type of device has a small cell area of 0.1 $\mu m^2$ or less and as such, the need for a technique for locally evaluating electrical properties of such device is increasing to forge ahead with further scaling down in the future.

Evaluation of electrical properties of the magnetoresistive effect device like this and the like, requires controlling the direction of a magnetic field in a magnetic material's layer. In this case, there is generally known a method of using an external permanent magnet, electromagnet, or the like to change the magnetic field in direction and strength and then transferring the sample into a material evaluating apparatus or the like to measure electrical properties of the sample.

Now, in the conventional electrical property evaluation apparatus, such as the above conventional electrical conductivity measuring apparatus having an electrode probe and spreading resistance measuring apparatus, it is possible to macroscopically evaluate a sample because of a large electrode probe tip curvature radius of a few hundreds of micrometers or more, whereas it is difficult to evaluate electrical properties for a micro-scale area of a few micrometers or smaller.

Also in the conventional scanning tunneling microscope, detailed surface information can be obtained by measuring a tunnel current. However, the metal probe thereof cannot be brought into contact with a sample directly because of the gap between the probe and the sample and therefore it is difficult to quantitatively gauge a tunnel current only for the sample.

Further, in the conventional material evaluating apparatus or the like for evaluating electrical properties of magnetoresistive effect devices, etc., the magnetic field in the sample is changed in direction and strength using an external permanent magnet, electromagnet or the like prior to the measurement of the electrical properties, and therefore it is difficult to measure the electrical properties while changing the magnetic field in a micro-scale area on the sample.

In the scanning multi-probe microscope capable of scanning in a magnetic field disclosed in the patent document, JP-A-2001-50885, because a sample is placed under a strong magnetic field produced by a superconducting magnet, there is a disadvantage in evaluating electrical properties of electronic materials and magnetoresistive devices including a tunnel magnetoresistive effect device such that a magnetic field of the magnetic material's layer thereof can be changed in direction, for example, under a weak magnetic field of approximately a few hundreds of gausses.

Moreover, the multi-probe microscope requires a sample set inside the vacuum container and as such, it has difficulties in transferring and operating the sample after once having set the sample. Also, because the size of a sample is restricted in the case of using the vacuum container, there is a disadvantage such that it is unsuitable for wafer-level measurement and evaluation of an electronic material.

The invention was made in consideration of these circumstances. It is an object of the invention to provide an electrical property evaluation apparatus capable of measuring a current, etc. of a sample in a micro-scale area thereof with the sample placed in a space of a magnetic field while controlling the strength of the magnetic field and the amount of change thereof.

SUMMARY OF THE INVENTION

In order to achieve the object, the invention provides the following means.

The electrical property evaluation apparatus of the invention may be an electrical property evaluation apparatus for measuring an electrical property of an object to be measured, the apparatus including a magnetic field generating mechanism for generating a magnetic field in a target area on the object; a magnetic sensor for measuring the magnetic field near the target area; a contact having a conducting probe, the contact being supported so that the probe can be brought into contact with the target area; a voltage source for applying a voltage to the probe; and an electrical property measuring section for measuring a current or an electrical resistance between the probe and the object in contact with each other.

The electrical property evaluation apparatus according to the invention includes the magnetic field generating mechanism, which makes it possible to cause an magnetic field to act on an object to be measured, and therefore applying a voltage to the probe in contact with a target area on the object allows the electrical property measuring section to measure a current or an electrical resistance flowing through the object under an arbitrary magnetic field. Thus, an electrical property, e.g. current distribution, electrical conductivity distribution, and electrical resistance distribution, can be obtained for a micro-scale target area in contact with the probe under an arbitrary magnetic field. Therefore, the degree of influence of an external magnetic field, e.g. the way the external magnetic field changes the foregoing electrical properties of an object to be measured, can be observed. Especially, samples of magnetoresistive effect devices, etc. can be easily and reliably evaluated in electrical properties, which have been difficult conventionally.

In addition, because a generated magnetic field can be reliably measured in strength, etc. with the magnetic sensor, for example, performing the feedback control of the magnetic field generating mechanism based on the measured values enables the application of a desired magnetic field to an object to be measured with high accuracy.

The electrical property evaluation apparatus of the invention may be the above electrical property evaluation apparatus, wherein the magnetic field generating mechanism includes a pair of magnetic field coils, each having a magnetic pole member, the magnetic field coils being located opposite to each other, and the magnetic sensor and contact are located in a center location between the pair of magnetic pole members.

In the electrical property evaluation apparatus according to the invention, two magnetic field coils are located opposite to each other and the magnetic sensor and contact are located in the center location between the paired magnetic field coils. Therefore, the gradient distribution of the strength of a magnetic field generated by the paired magnetic field coils reaches the minimum thereof in the target area and a desired magnetic field can be easily obtained with high accuracy. Moreover, the magnetic field generating mechanism can be arranged easily, because the magnetic field which the pair of magnetic field coils generate with respect to an object to be measured can be controlled only by a current flowing through the magnetic field coils.

The electrical property evaluation apparatus of the invention may be the above electrical property evaluation apparatus, wherein the pair of magnetic pole members are shaped into a rod or strip form and located with an inclination to a surface of the target area with tips thereof facing to the target area.

In the electrical property evaluation apparatus according to the invention, one pair of the magnetic pole members are provided with an inclination to the surface of the target area with the tips thereof facing to the target area. Therefore, it becomes possible to generate a magnetic field with respect to an object to be measured without being restricted by the size of the object. More specifically, the tips of the magnetic pole members can be brought as near to the target area on the sample as possible to generate a magnetic field locally. In addition, because the magnetic field generating members can be brought close to the target area, the magnetic field can be generated with a small amount of current effectively.

The electrical property evaluation apparatus of the invention may be any one of the above electrical property evaluation apparatuses, further including a moving mechanism capable of relatively moving the contact and the object to be measured thereby to scan while keeping the probe in contact with the object.

In the electrical property evaluation apparatus according to the invention, the probe can be brought into contact with an object to be measured to scan the object while gauging a current or an electrical resistance in the object because the apparatus includes the moving mechanism. This allows the measurement of a current image, etc. of the object, and therefore the electrical property distributions for the object can be obtained.

In the electrical property evaluation apparatus of the invention, the contact is a cantilever, and the apparatus further includes a bending measurement mechanism for measuring an amount of bending of the cantilever when the probe is brought into contact with the object to be measured; and a control section for controlling the moving mechanism so as to make the bending amount obtained in the bending measurement mechanism constant.

In the electrical property evaluation apparatus according to the invention, the bending amount of the cantilever can be measured with the measurement mechanism while scanning an object to be measured with the cantilever. Therefore, it is possible to measure up and down displacement amounts of the cantilever with respect to the surface profile of the object. By measuring the up and down displacement amounts, the cantilever can be moved up and down so as to keep the displacement amounts constant, and also the surface profile of the object can be easily observed directly based on the displacement amounts. This allows the smooth scanning of the object and the scanning the same place while applying a bias voltage. Therefore, an electrical property distribution for the object can be evaluated for the scanned region.

DESCRIPTION OF THE PREFERRED EMBODIMENTS

In reference to FIGS. 1 to 4 an embodiment according to the invention will be described in detail below.

Figure 1:
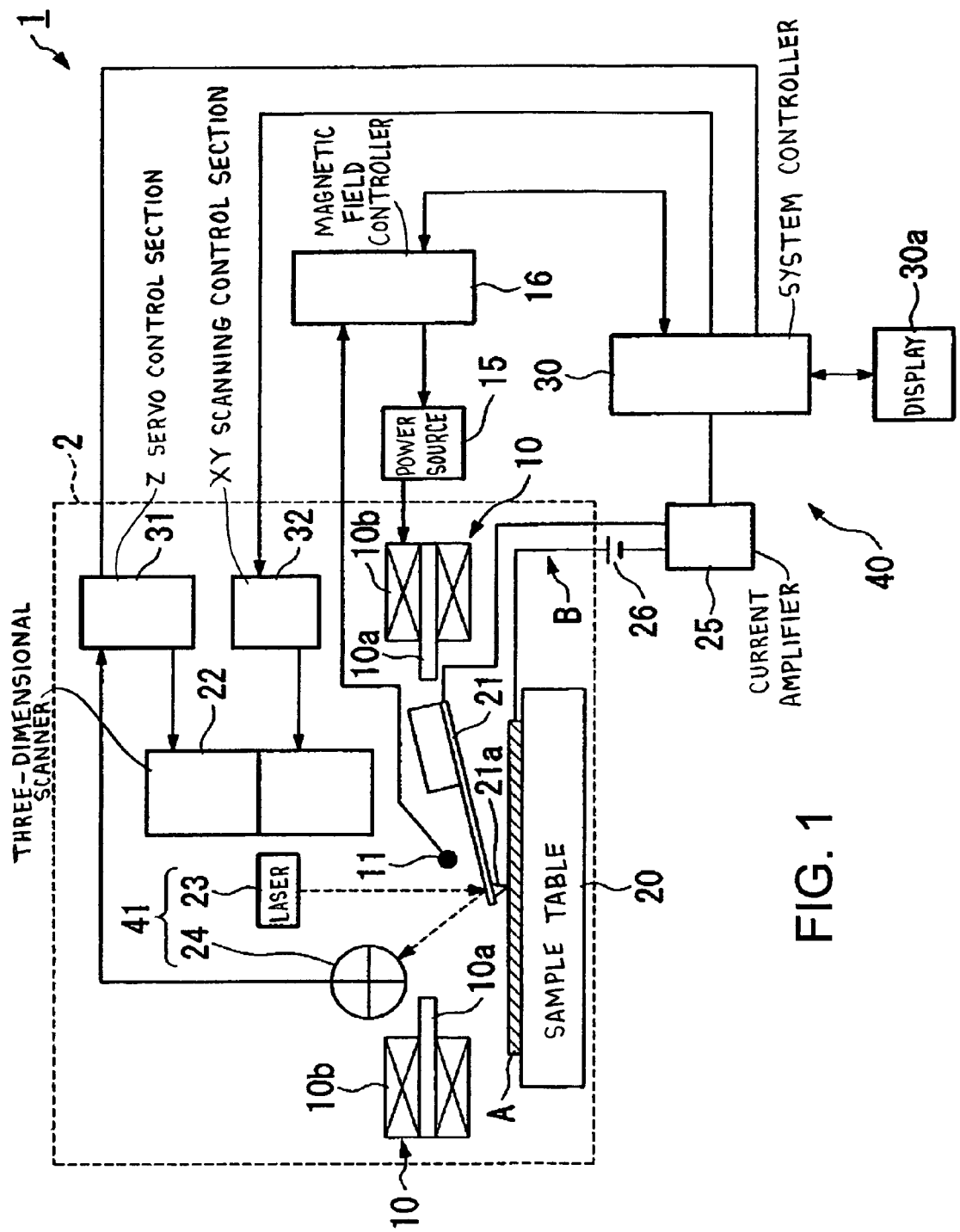
FIG. 1 is a block diagram showing an electrical property evaluation apparatus according to an embodiment of the invention.

FIG. 1 is a block diagram showing an electrical property evaluation apparatus according to an embodiment of the invention. The electrical property evaluation apparatus 1 shown in FIG. 1 includes a probe microscope measurement section 2 for measuring electrical properties of a sample (an object to be measured) A with a magnetic field applied thereto. The probe microscope measurement section 2 includes a pair of magnetic field coils (a magnetic field generating mechanism) 10 for generating a magnetic field in a target area on the sample A; a magnetic sensor 11 for measuring the magnetic field near the target area; and a cantilever (contact) 21 which has a conducting probe 21a and is so supported that the probe 21a can be brought into contact with the target area. The probe 21a is formed from a material, such as silicon and silicon nitride, which is coated with a conducting material, such as gold, platinum, and diamond-like carbon. Also the probe 21a may be made from a hard conducting material, such as carbon nanotube, and diamond single crystal.

The electrical property evaluation apparatus 1 further includes a bias voltage source (voltage source) 26 for applying a voltage to the probe 21a, and an electrical property measuring section 40 for measuring the current or electrical resistance between the probe 21a and a sample A in contact with each other.

The probe microscope measurement section 2 has a sample table 20 for fixing a sample A, a three-dimensional scanner (moving mechanism) 22 for moving the cantilever 21 relative to the sample A, a laser source 23 for irradiating the cantilever 21 with a laser beam, and an optical location detector 24 for detecting the laser beam reflected by the cantilever 21.

The sample table 20 is a stage having a top surface on which the sample A can be fixed, and the table is movable in X and Y directions. The sample table 20 is arranged so as to move the sample A to the center location between a pair of magnetic pole members 10a. The sample A is electrically connected during use of the apparatus with a current amplifier 25 through the bias voltage source 26 for applying a bias voltage to the current amplifier 25. The cantilever 21 is shaped into a lever form, and the cantilever is formed from a material, e.g., silicon and silicon nitride. Further, on the top surface of the cantilever 21 there is, as a coating, a conducting material of gold, platinum, a carbon-based material, e.g., diamond-like carbon, etc. The cantilever 21 is mechanically coupled to the three-dimensional scanner 22, and therefore the cantilever 21 is so arranged that it can be finely moved by the scanner 22 relative to the sample A in all directions, i.e., up and down, right and left, and back and forth. More specifically, the sample A is moved by the sample table 20 so that the cantilever 21 is located over a target area on the sample A, and then the position of the cantilever 21 is controlled by the three-dimensional scanner 22 with high accuracy. Also, one end of the cantilever 21 is electrically connected with the current amplifier 25.

Because the current amplifier 25 is electrically connected with the cantilever 21 and the sample A as described above, a circuit B is formed between them when the probe 21a of the cantilever 21 is brought into contact with the sample A. Particularly, the probe 21a serves as a switch. The current amplifier 25 has the function of amplifying a current generated in the sample A to send the amplified current to the system controller 30 when a bias voltage is applied between the sample A and probe 21a according to the bias voltage source 26. The system controller 30 is connected with a display section 30a for displaying the current value. In other words, the cantilever 21, current amplifier 25, bias voltage source 26, system controller 30, display section 30a, and circuit B constitute an electrical property measuring section 40 for measuring the current or electrical resistance between the pro be 21a and sample A.

A laser source 23 and an optical location detector 24 are provided so as to move together with the three-dimensional scanner 22, and the laser source 23 is disposed above the cantilever 21 so as to irradiate the rear of the probe 21a of the cantilever 21 with a laser beam. The optical location detector 24 has the function of detecting the laser beam reflected off the rear of the cantilever 21 as a reflected light. The value detected by the optical location detector 24 is entered into a Z servo control section (control section) 31. The Z servo control section 31 has the function of operating the three-dimensional scanner 22 based on the detected value entered thereinto to control the cantilever 21 in the Z direction, i.e., the height of the cantilever 21 from the sample A. This allows controlling the amount of the bending of the cantilever 21 so that it is held constant at all times. The laser source 23 and optical location detector 24 constitute a bending measurement mechanism 41 for measuring the amount of bending of the cantilever 21 when the probe 21a of the cantilever 21 is brought into contact with the sample A.

The three-dimensional scanner 22 is connected with an XY scanning control section 32 which operates the three-dimensional scanner 22 to control and move the cantilever 21 in X and Y directions, i.e. back and forth and left and right directions with respect to the sample A. The Z servo control section 31 and XY scanning control section 32 are electrically connected with the system controller 30 and therefore comprehensively controlled by the system controller 30.

Figure 2A:
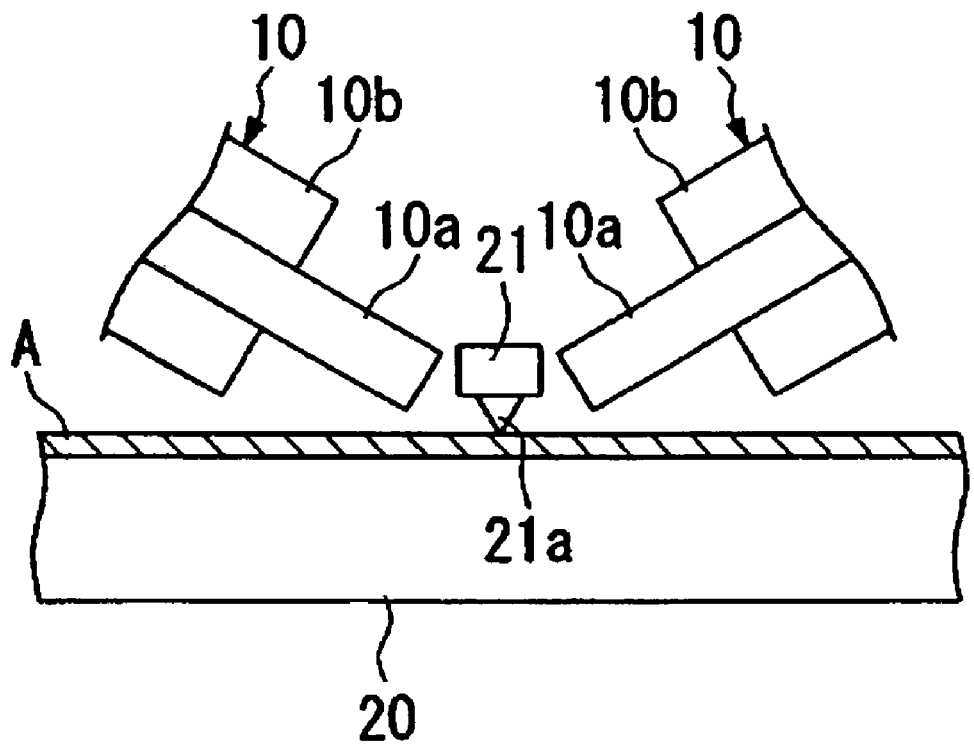
FIG. 2A is an enlarged side view of an important part showing the way that the magnetic field generating coils, cantilever and magnetic sensor of the electrical property evaluation apparatus shown in FIG. 1 are positioned.
Figure 2B:
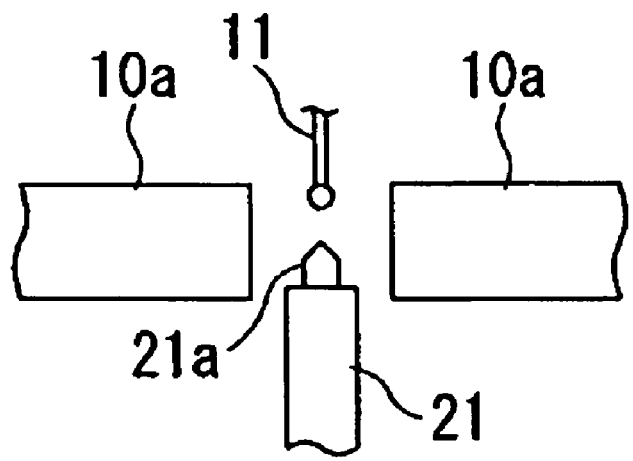
FIG. 2B is an enlarged top view of the important part shown in FIG. 2A.

FIG. 2A is an enlarged side view of an important part showing the way the magnetic field generating coils, cantilever and magnetic sensor of the electrical property evaluation apparatus shown in FIG. 1 are positioned; FIG. 2B is an enlarged top view of the important part shown in FIG. 2A.

Herein, as shown in FIG. 2A, two magnetic field coils 10, each of which is configured by winding a coil 10b around an elongate magnetic pole member 10a shaped into a strip form, are located in spaced-apart relation opposite to each other and inclined relative to the surface of the sample A with the tips of the magnetic pole members 10a facing to the target area on the sample A. Further, as shown in FIG. 2B, in the center region or location of the pair of magnetic pole members 10a is provided the magnetic sensor 11 for measuring the density of magnetic flux of the cantilever 21, a Hall device, etc.

Referring to FIG. 1 again, wherein the pair of magnetic field coils 10 are electrically connected with a coil power source 15 for magnetic field generation and a magnetic field controller 16. In FIG. 1, while the arrow representing the signal input into the left magnetic field coil 10 is omitted, the left magnetic field coil 10 is also electrically connected with the coil power source 15 for magnetic field generation and magnetic field controller 16 as in the case of the right magnetic field coil 10.

The magnetic sensor 11 is electrically connected with the magnetic field controller 16. The magnetic sensor 11 measures a magnetic field generated by the magnetic field coils 10 and produces a measured signal that is supplied to the magnetic field controller 16. The magnetic field controller 16 sends a control signal to the coil power source 15 for magnetic field generation based on the measured signal. The coil power source 15 for magnetic field generation has the function of flowing a current through both the magnetic field coils 10 based on the received control signal. In other words, the magnetic sensor 11, coil power source 15 for magnetic field generation, and magnetic field controller 16 control the magnetic field generated by the magnetic field coils 10 so that it has the desired strength. In addition, the magnetic field controller 16 is connected with the system controller 30 and controls the magnetic field based on the program preset in the system controller 30 so as to supply the sample A with the magnetic field with a given strength, a given polarity, a given variable amount, etc.

Figure 3:
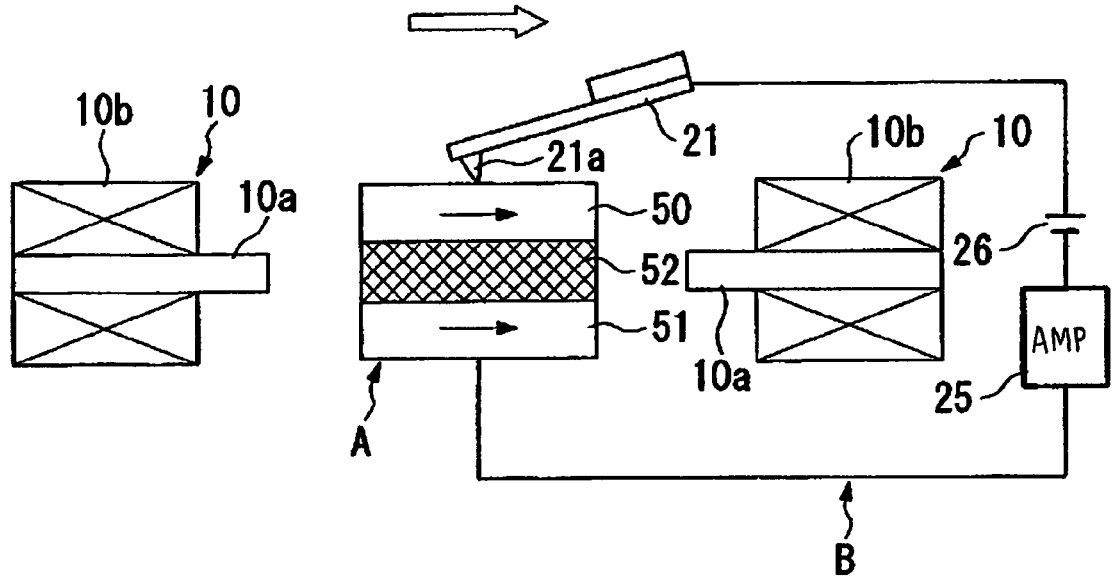
FIG. 3 is an illustration showing the relation between the direction of the external magnetic field generated by the magnetic field generating coils and the direction of the internal magnetic field of the sample, and more concretely it shows the case where the direction of the internal magnetic field of the free layer of the sample is the same as that of the fixed layer.
Figure 4:
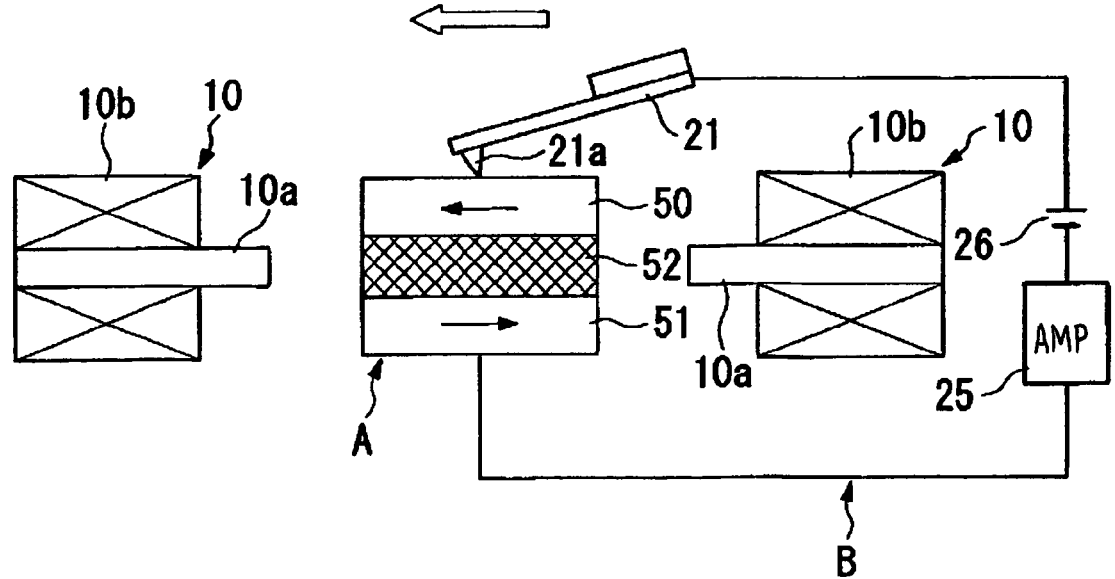
FIG. 4 is an illustration showing the relation between the direction of the external magnetic field generated by the magnetic field generating coils and the direction of the internal magnetic field of the sample, and more concretely it shows the case where the direction of the internal magnetic field of the free layer of the sample is opposite to that of the fixed layer.

FIG. 3 is an illustration showing the relation between the direction of the external magnetic field generated by the magnetic field generating coils 10 and the direction of the internal magnetic field of the sample A, and more concretely it shows the case where the direction of the internal magnetic field of the free layer 50 of the sample is the same as that of the fixed layer 51. FIG. 4 is an illustration showing the relation between the direction of the external magnetic field generated by the magnetic field generating coils 10 and the direction of the internal magnetic field of the sample A, and more concretely it shows the case where the direction of the internal magnetic field of the free layer 50 of the sample is opposite to that of the fixed layer 51.

As shown in FIGS. 3 and 4, the sample A is a magnetoresistive effect device, which is formed in a three-layer structure having a ferromagnetic free layer 50, a fixed layer 51, and a nonmagnetic layer 52 of an insulator interposed between the free layer 50 and fixed layer 51. The free layer 50 is formed from a ferromagnetic material such that the direction of the internal magnetic field (indicated by a black arrow) changes in response to the direction of the external magnetic field (indicated by a white arrow) of, for example, a few hundreds gausses. In contrast, the fixed layer 51 is formed from a ferromagnetic material such that the direction of the internal magnetic field is not affected by a weak magnetic field of a few hundreds gausses. Incidentally, it is assumed that the direction of the internal magnetic field of the free layer 50 is the same as the direction of the internal magnetic field of the fixed layer 51 in a pre-measurement condition.

In the electrical property evaluation apparatus 1 arranged in this way, when a sample A is placed and fixed on the sample table 20, the system controller 30 controls the Z servo control section 31 and XY scanning control section 32 to move the cantilever 21 into a target area on the sample A and bring the probe 21a at the tip of the cantilever 21 into contact with the sample A. Then, the system controller 30 controls the magnetic field controller 16 to cause the coil power source 15 for magnetic field generation to flow a given current through the coil 10b of the magnetic field coil 10, and generate a magnetic field of a given strength in the target area on the sample A. During this process, the direction of the external magnetic field applied to the sample A is the same as that of the internal magnetic field of the free layer 50 of the sample A.

Subsequently, a bias voltage is applied between the probe 21a and the sample A using the bias voltage source 26. When the bias voltage is applied, a current depending on the applied magnetic field flows through the target area on the sample A. The current amplifier 25 detects and amplifies the current to send it as a detected value to the system controller 30. The system controller 30 causes the display section 30a to display the current value.

Then, while keeping the cantilever 21 in the same position, an external magnetic field is applied to the sample A in a direction (represented by the white arrow) opposite to the internal magnetic field direction (represented by the black arrow) of the fixed layer 51 by the magnetic field coils 10, as shown in FIG. 4. This changes the internal magnetic field direction of the free layer 50 into the same direction as that of the external magnetic field (represented by the black arrow). In other words, the magnetic field is generated so as to make the internal magnetic field directions of the free layer 50 and fixed layer 51 opposite to each other. When such condition is achieved, the value of the current flowing through the target area on the sample A is gauged or measured by the system controller 30.

Here, the following two points are noted. In the case where the internal magnetic field directions of the free layer 50 and fixed layer 51 coincide with each other, the current generated by the bias voltage easily flows and thus a large current value is gauged because the resistance value of the sample A is small. In contrast, in the case where the internal magnetic field directions of the free layer 50 and fixed layer 51 are opposite to each other, the current generated by the bias voltage is hard to flow and thus a small current value is gauged because the resistance value of the sample A is large.

In this manner, the value of the current flowing the sample A varies according to the direction of the magnetic field generated by the magnetic field coils 10. These current values are gauged or measured by the system controller 30 to analyze the difference therebetween, whereby various kinds of data, such as a current image, an electrical conductivity distribution, a current characteristic, and a magnetoresistance image, can be obtained in a target area on the sample A, i.e., a micro-scale area the probe 21a is in contact with and therefore the electrical properties of the sample A can be evaluated.

The strength and direction of the magnetic fields that the magnetic field coils 10 generate are controlled by a program preset in the system controller 30 and as such, the value of the current flowing through the sample A can be gauged or measured while changing the strength and direction of the magnetic field easily. Thus, the relations of various kinds of electrical property values including a current value, an electrical property distribution for the sample A, etc., with respect to the strength of the external magnetic field can be obtained easily.

By applying the magnetic field to the sample A by the magnetic field coils 10 in parallel with causing the cantilever 21 to scan, various kinds of data, such as a current image, an electrical conductivity distribution, a current characteristic, and a magnetoresistance image, can be easily obtained for the range of the scanning. Further, a displacement amount depending to the surface profile of the sample A can be measured with the laser source 23 and optical location detector 24 in scanning the sample A, and therefore the surface profile of the sample A can be also obtained easily.

More specifically, in the condition where a current value in the sample A is gauged as described above, the system controller 30 controls the XY scanning control section 32 to operate the three-dimensional scanner 22, whereby the probe 21a at the tip of the cantilever 21 is moved with the probe in contact with the sample A. In other words, the cantilever 21 moves while scanning the sample A. In moving, the cantilever 21 is displaced up and down according to the surface profile of the sample A. The up and down displacement of the cantilever 21 makes a variation of the reflection angle of the laser beam which the laser source 23 directs toward the rear of the cantilever 21. The amount of the variation of the reflected light is detected by the optical location detector 24 to be sent to the Z servo control section 31. The Z servo control section 31 sends a control signal to the three-dimensional scanner 22 so as to control the three-dimensional scanner 22 in up and down directions based on the detected value and as such, the cantilever 21 is caused to scan the sample A in the condition where it is kept at a fixed height from the sample A.

Now, when it is intended to measure the nonmagnetic layer 52 of the sample A, the free layer 50 is removed to expose the nonmagnetic layer 52 at the surface of the sample and then bring the cantilever 21 into contact with the nonmagnetic layer 52. In this condition, the cantilever 21 is moved while measuring the current values in the sample A as described above. For example, in the case where there is a defective insulation in the nonmagnetic layer 52 of the sample A, the current is leaked from the defective portion and as such this scanning can provide a leakage current image, insulating property distribution, etc. of the sample A easily.

The electrical property evaluation apparatus 1, wherein a pair of magnetic field coils 10 are disposed near the sample A, allows the measurement of a current value in a micro-scale area on the sample A while changing a given magnetic field applied to the sample A in strength, direction, etc. by the magnetic sensor 11, coil power source 15 for magnetic field generation, magnetic field controller 16, and system controller 30. Therefore it is possible to measure a current distribution, electrical conductivity distribution, electrical resistance distribution, magnetoresistance distribution, etc. in a micro-scale area on the sample A in any magnetic fields, whereby the electrical properties of the sample A can be evaluated easily. Also, this enables easy and reliable evaluation of electrical properties of samples including a magnetoresistive effect device, etc. which have been conventionally hard to measure. Further, causing the cantilever 21 to scan the sample A allows easy measurement of the current distribution, insulating property distribution, surface profile, etc. of the sample A.

Also, because two of the magnetic field coils 10 are located opposite to each other and the magnetic sensor 11 and cantilever 21 are located in a center location between the paired magnetic field coils 10, the gradient distribution of the strength of a magnetic field generated by the paired magnetic field coils 10 reaches the minimum thereof in the target area on the sample A and therefore a desired magnetic field can be easily obtained with high accuracy.

Furthermore, because the magnetic pole members 10*a* of the pair of the magnetic field coils 10 are provided with an inclination to the surface of the target area on the sample A with the tips thereof facing to the target area, the tips of the magnetic pole members 10*a* can be brought as near to the target area on the sample A as possible to generate a magnetic field locally. In addition, the magnetic field can be generated effectively with a small amount of current.

The technical scope of the invention is not limited to the above embodiment, and various modifications may be made without departing from the spirit of the invention.

While in the embodiment the cantilever 21 is moved on a microscale in scanning the sample A, the invention is not so limited and it is essential only that the cantilever 21 is arranged so as to be movable relative to the sample A. For example, the three-dimensional scanner 22 may move the sample table 20 on a microscale.

In addition, an optical lever-type bending measurement mechanism 41 including a laser source 23 and an optical location detector 24 has been adopted as a measurement mechanism for a bending amount of the cantilever 21 in the embodiment. However, the invention is not so limited, and it is essential only that the apparatus has an arrangement which allows the measurement of the bending amount of the cantilever 21. For example, the cantilever may be arranged as a self-sensing type cantilever capable of detecting the bending amount by itself.

While the arrangement wherein one current amplifier 25 is connected has been adopted here, a plurality of current amplifiers may be connected instead of doing so. In this case, for example, connecting current amplifiers different in measurable current range allows the measurement of current values in a micro-scale area on the sample A in an extended current region, and the automatically-switched current amplifiers can provide electrical properties reliably.

An electrical property evaluation apparatus according to the invention includes a magnetic field generating mechanism, which makes it possible to cause a magnetic field to act on an object to be measured. Further, the electrical property measuring section allows the measurement of a current flowing through or an electrical resistance in the object under an arbitrary magnetic field. Thus, an electrical property, e.g. current distribution, electrical conductivity distribution, and electrical resistance distribution, can be obtained for a micro-scale target area in contact with the probe under an arbitrary magnetic field. Therefore, the degree of influence of an external magnetic field, e.g. the way the external magnetic field changes the foregoing electrical properties of an object to be measured, can be observed. Especially, samples of magnetoresistive effect devices, etc., which have been difficult to evaluate electrical properties conventionally, can be easily and reliably evaluated in electrical properties.

What is claimed is:

1. An electrical property evaluation apparatus for measuring an electrical property of an object, comprising:
   a magnetic field generating mechanism that generates a magnetic field in a target area on an object to be measured, the magnetic field generating mechanism including a pair of magnetic field coils, each magnetic field coil having a magnetic role member, and the magnetic field coils being located opposite to each other;
   a magnetic sensor for measuring the magnetic field near the target area;
   a cantilever having a conducting probe, the cantilever being supported so that the probe can be brought into contact with the target area, and the cantilever and the magnetic sensor being located in a center location between the pair of magnetic pole members;
   a moving mechanism that moves the cantilever relative to the object to carry our scanning while keeping the probe in contact with the object;
   a bending measurement mechanism that measures an amount of bending of the cantilever when the probe is brought into contact with the object;
   a control section that controls the moving mechanism so as to maintain the bending amount of the cantilever constant;
   a voltage source for applying a voltage to the probe; and
   an electrical property measuring section that measures a current or an electrical resistance between the probe and the object in contact with each other.

2. An electrical property evaluation apparatus according to claim 1; wherein the pair of magnetic pole members are shaped into a rod or strip form and disposed at an inclination to a surface of the target area with tips thereof facing toward the target area.

3. An electrical property evaluation apparatus for measuring an electrical property of an object, comprising:
- a magnetic field generating mechanism that generates a magnetic field in a target area of an object to be measured, the magnetic field generating mechanism including a pair of spaced-apart magnetic field coils each having a magnetic pole member;
- a magnetic sensor for measuring the magnetic field near the target area;
- a cantilever having a conducting probe and being supported so that the probe can be brought into contact with the target area, the cantilever and the magnetic sensor being located in a center region between the pair of magnetic pole members;
- a voltage source for applying a voltage to the probe; and
- an electrical property measuring section that measures a current or an electrical resistance between the probe and the object in contact with each other.

4. An electrical property evaluation apparatus according to claim 3; wherein the pair of magnetic pole members have an elongate shape and are disposed at an inclination relative to a surface of the target area such that tips of the magnetic pole members face toward the target area.

5. An electrical property evaluation apparatus according to claim 4; wherein the cantilever is bendable; and further including a moving mechanism that scans the cantilever relative to the object while keeping the probe in contact with the object; a bending measurement mechanism that measures an amount of bending of the cantilever when the probe is brought into contact with the object; and a control section that controls the moving mechanism so as to maintain the bending amount of the cantilever constant.

6. An electrical property evaluation apparatus according to claim 3; wherein the cantilever is bendable; and further including a moving mechanism that scans the cantilever relative to the object while keeping the probe in contact with the object; a bending measurement mechanism that measures an amount of bending of the cantilever when the probe is brought into contact with the object; and a control section that controls the moving mechanism so as to maintain the bending amount of the cantilever constant.

* * * * *